United States Patent [19]

Schroeder et al.

[11] Patent Number: 5,057,362

[45] Date of Patent: Oct. 15, 1991

[54] MULTILAYER CERAMIC OXIDE SOLID ELECTROLYTE FOR FUEL CELLS AND ELECTROLYSIS CELLS

[75] Inventors: James E. Schroeder, Claremont, Calif.; Harlan U. Anderson, Rolla, Mo.

[73] Assignee: California Institute of Technology, Pasadena, Calif.

[21] Appl. No.: 553,477

[22] Filed: Jul. 13, 1990

Related U.S. Application Data

[62] Division of Ser. No. 151,172, Feb. 1, 1988, Pat. No. 4,957,673.

[51] Int. Cl.$^5$ .......................... B32B 18/00; B32B 5/18
[52] U.S. Cl. .............................. 428/312.2; 428/312.8; 428/315.5; 428/315.7; 428/315.9; 428/689; 428/699
[58] Field of Search ............... 428/312.2, 312.8, 318.8, 428/318.6, 315.5, 315.7, 315.9, 316.6, 319.1, 689, 699

[56] References Cited

U.S. PATENT DOCUMENTS

| | | |
|---|---|---|
| 1,956,607 | 5/1934 | Wyatt et al. .......................... 156/89 |
| 2,582,993 | 1/1952 | Howatt ................................. 156/89 |
| 3,012,086 | 7/1957 | Vahldieck ............................. 429/30 |
| 3,143,440 | 8/1964 | Hunger et al. ....................... 429/30 |
| 3,441,390 | 4/1969 | Backe et al. ........................ 428/553 |
| 3,460,991 | 8/1969 | White ................................... 429/30 |
| 3,703,413 | 11/1972 | Arrance .............................. 429/217 |
| 3,793,084 | 2/1974 | Marchetto ............................ 429/40 |
| 4,007,059 | 2/1977 | Witherspoon et al. ............... 429/40 |
| 4,064,207 | 12/1977 | DeCrescente et al. ............ 264/29.6 |
| 4,091,176 | 5/1978 | Alfenaar .............................. 429/40 |
| 4,100,331 | 7/1978 | Ingham et al. ....................... 429/40 |
| 4,175,153 | 11/1979 | Dobo et al. .......................... 429/40 |
| 4,395,468 | 7/1983 | Isenberg .............................. 429/31 |
| 4,431,715 | 2/1984 | Isenberg .............................. 429/30 |
| 4,459,341 | 7/1984 | Marchant et al. .................... 429/33 |
| 4,462,891 | 7/1984 | Lawless ............................. 204/427 |
| 4,490,444 | 12/1984 | Isenberg .............................. 429/31 |
| 4,506,028 | 3/1985 | Fukuda et al. ....................... 429/40 |
| 4,520,082 | 5/1985 | Makiel ................................. 429/31 |
| 4,554,225 | 11/1985 | Sounai et al. ........................ 429/34 |
| 4,587,068 | 5/1986 | Borase et al. ....................... 264/63 |
| 4,598,028 | 7/1986 | Rossing et al. ...................... 429/30 |
| 4,615,717 | 10/1986 | Neubauer et al. .................. 158/181 |
| 4,698,192 | 10/1987 | Kuze et al. ........................... 264/60 |
| 4,740,287 | 4/1988 | Cawfield ............................ 204/284 |
| 4,756,956 | 7/1988 | Nagai et al. ...................... 428/312.8 |
| 4,783,231 | 11/1988 | Raley ................................. 158/181 |
| 4,798,758 | 1/1989 | Nagano et al. .................... 428/318.8 |

FOREIGN PATENT DOCUMENTS 57-60670 4/1982 Japan .
58-166639 10/1983 Japan .

OTHER PUBLICATIONS

Schutz, Master Thesis; Title: A Preliminary Investigation of Radiation Catalysis in Fuel Cells; Aug. 1979, Virginia Polytechnic Institute and State University, Blacksburg, Va.; pp. 56 to 66 only.

Primary Examiner—William J. van Balen
Attorney, Agent, or Firm—F. Eugene Logan

[57] ABSTRACT

A unitary layered ceramic structure is disclosed which comprises co-sintered layers. The co-sintered structure comprises a sintered central layer of yttria stabilized zirconia ("YSZ") which is about 8 mole percent yttria and having a density of at least about 95% of theoretical, and sintered outer layers of strontium lanthanum manganite ("LSM") having the approximate molecular composition $La_{0.8}Sr_{0.2}MnO_3$, having a density from about 50 to about 60% of theoretical, and having interconnected porosity from about 40 to 50% with an interconnected pore diameter from about one micron to about five microns. The sintered central layer is sandwiched by and bonded and sintered to the outer layers and is essentially free of significant amounts of manganese.

A process for making the unitary composition-of-matter is also disclosed which involves tape casting a LSM tape and then on top thereof casting a YSZ tape. The process comprises presintering LSM powder at 1250° F., crushing the presintered commercially available LSM powder, forming a slurry with the crushed LSM, a binder and solvent, tape casting the slurry and allowing the slurry to air dry. A mixture of commercially available submicron size particle YSZ powder is milled with a dispersant and solvent to disperse the YSZ particles thereby forming a dispersed YSZ slurry. The YSZ slurry is then tape cast on the dried LSM tape. If desired, a third layer of LSM can be cast on top of the dried YSZ layer. After drying the composite LSM/YSZ and LSM/YSZ/LSM tapes are fired at 1300° C. No migration of manganese into the YSZ layer was observed with scanning electron microscope/edax in the sintered multilayer tape.

25 Claims, No Drawings

MULTILAYER CERAMIC OXIDE SOLID ELECTROLYTE FOR FUEL CELLS AND ELECTROLYSIS CELLS

ORIGIN OF INVENTION

The invention described herein was made in the performance of work under a NASA contract, and is subject to the provisions of Public Law 96-517 (35 USC 202) in which the Contractor has elected to retain title.

This application is a division of Ser. No. 151,172, filed Feb. 1, 1988, now U.S. Pat. No. 4,957,673.

BACKGROUND OF THE INVENTION

This invention relates to the production of tapes such as tapes comprising a center layer of yttria stabilized zirconia sandwiched between outer layers of strontium doped lanthanum manganite. Such tapes are useful as membrane materials in fuel cells, gas separating devices and the like and specifically in high temperature solid electrolyte fuel cells and high temperature solid electrolyte electrolysis cells herein referred to collectively as "tape-containing devices".

Yttria stabilized zirconia, which for brevity is sometimes referred to herein as "YSZ", is known to be a good material for use in the electrolyte layer in such tape-containing devices. However it has been found that tapes cast using commercially available YSZ powders require a sintering temperature of at least 1400° C. in order to produce a YSZ layer having a density of at least about 95% of theoretical density.

Strontium doped lanthanum manganite, which for brevity is sometimes referred to herein as "LSM", is known to be a good material for use in electrodes produced by tape casting methods. LSM having the mole ratio $La_{0.8}Sr_{0.2}MnO_3$ is available as a submicron size material having a surface area of 3 to 5 $m^2/g$ from HUA Associates, Rolla, Mo. However it has been found that this powder when sintered at 1400° C., or even at 1300° C., forms too dense a layer for use as an efficient electrode material in such tape-containing devices.

Furthermore, green LSM-YSZ-LSM layer tapes when sintered at 1400° C. causes the manganese in the outer layers to migrate into the center YSZ layer thereby adversely affecting the electrical properties of the tape for use in such tape-containing devices.

Accordingly, it would be useful to produce a tape for use in such tape-containing devices that would have a central YSZ layer having at relatively high theoretical density sandwiched between outer LSM layers having a relatively low theoretical density without significant migration of manganese from the outer layers into the central layer.

SUMMARY OF THE INVENTION

Sintered ceramic membranes comprising a central YSZ electrolyte bonded to and sandwiched between outer layers of LSM which serve as electrodes can be used to separate oxygen from air. Accordingly, it can be appreciated that devices comprising such membranes can be used to produce pure oxygen from a molecular oxygen containing gas. Such oxygen can be used for example to produce breathing air for the medical field for patients having respiratory difficulties without the need for reliance upon cylinders of high pressure breathing air or to separate oxygen from oxygen containing gases which will break down at the membrane under an applied voltage. While yttria stabilized zirconia is the preferred electrolyte it should be understood that other stabilizers can be used with zirconia and that this invention covers such other stabilizers as well as yttria. Examples of other stabilizers that can be used with zirconia are ytterbia, magnesia, calcia and gadolinia. Furthermore, beside zirconia other valence 4 oxides can be used for the electrolyte such as hafnia and ceria. Furthermore, while 8 mole % yttria content is preferred for the YSZ, other amounts of yttria can be used for stabilizing zirconia.

While strontium doped lanthanum manganite is the preferred electrode material, it should be understood that in this invention doping or conductivity improving agents other than strontium can be used in the electrode material including calcium. Oxides other than manganite can be used if they have operable electronic conduction, resistance to oxygen at elevated temperatures including 1000° C., stability for long periods of time at elevated temperatures including 1000° C., and a coefficient of thermal expansion operable for maintaining a sintered bond with the electrolyte at elevated temperatures without delaminating. For example, doped chromites rather than manganites can be used for the electrode material. Furthermore, although a formula ratio of $La_{0.8}Sr_{0.2}MnO_3$ is preferred for LSM, other ratios can be used including ratios from about $La_{0.9}Sr_{0.1}MnO_3$ to about $La_{0.5}Sr_{0.5}MnO_3$.

Accordingly, comments concerning YSZ and LSM are to be understood to be applicable to other electrolytes and electrode materials unless specifically stated to be otherwise not applicable.

In this invention the sintering temperatures of normally highfired ceramics, such as YSZ are lowered by utilizing submicron sized particles, and by controlling the particle and pore size distribution in the unfired layer by dispersion methods.

In this invention the sintering temperatures of normally lowerfired ceramics, such as LSM are raised by utilizing micron-sized agglomerates; by increasing the pore size of the unfired layers; and by addition of organic binders and plasticizers.

In this invention a superior metal oxide sandwich structure with porous electrodes and a dense electrolyte layer is produced at a substantially lower single firing temperature.

This invention is also an improved ceramic structure and method of producing. In particular this invention is an improved multilayer ceramic tape and casting method utilizing two or more ceramic materials of differing sintering temperatures which comprises physically modifying and lowering the sintering temperature of the higher sintering material; physically modifying and raising the sintering temperature of the lower sintering material to a common temperature of sintering for all materials; bonding separate layers of the two or more ceramic materials together; and sintering the thusly bonded layers at a temperature substantially lower than that normally required for the higher sintering material but higher than that required for the lower sintering material when it is to retain after sintering substantial amounts of interconnected pores.

In general, refractory electrolyte materials are relatively difficult to sinter compared to refractory electrode materials. In this invention, sintering of the electrolyte material to full or nearly full theoretical density, i.e. without pores or nearly without pores, is achieved by complete dispersion of the electrolyte material in a slurry prior to electrolyte casting. In general, refractory electrode materials are relatively easy to sinter compared to refractory electrolyte materials. In this invention, high porosity in the sintered electrode layer is achieved by precoarsening, i.e. preagglomerating, the electrode material and use of the precoarsened electrode with a considerable amount of binder-plasticizer to form the electrode material-containing casting slurry. In this invention, the amount of binder-plasticizer used in the electrode material-containing slurry is operable to support the completely formed but unsintered multilayer tape and as a consequence no binder, or very little binder, is required for the electrolyte material-containing casting slurry. Since porosity can be increased in sintered tapes by increasing the amount of binder-plasticizer in the slurry from which tapes are cast, in this invention no binder or very little binder is used in the electrolyte materialcontaining slurry.

In this invention, the method used to fabricate multilayer ceramics is tape-casting. Tape-casting has an advantage over other methods in that thin layers of uniform thickness can be easily produced. With tape-casting it is also possible to cast multiple layers on top of each other, or alternatively the layers or combination of layers can be cast separately and subsequently laminated. Since tapecasting is a mature technology, equipment of various sizes is commercially available.

Tape-cast layers made from commercially available YSZ powders require a sintering temperature of at least 1400° C. to become dense. This is because very fine particles such as 500 to 1000 angstrom units in such YSZ powders are highly agglomerated and it is difficult to remove the large interagglomerate pores. However, LSM powders sinter to an overly dense layer at 1400° C. and the manganese therein migrates from the LSM layer into the YSZ layer, thereby adversely affecting the electrical properties.

The LSM layer or electrodes must have an interconnected porosity of at least about 50% that remains constant over long periods of times at 1000° C. so that the air can diffuse through the electrode layer to the YSZ electrolyte. The YSZ electrolyte layer must be at least about 95% of theoretical density and be crack-free so that there is no transport of gases through the layer except by the ionic conduction of oxygen thereby enabling oxygen to be separated from air.

The interface that exists between the electrolyte and electrode should be stress-free and have low ionic/electronic resistance. The boundary between the three phases of YSZ, LSM and air, i.e. the three phase boundary should be as large as possible to facilitate the diffusion of oxygen to the electrolyte since that is the site in the membrane where oxygen molecules are disassociated and pick up electrons to be ionized and transported through the ionic YSZ conductor.

To maximize cell efficiency it is desirable to make both electrolyte and electrode layers as thin as is practical, especially the electrolyte layer whose ionic resistance is approximately 100 times greater than that the electronic resistance of the electrode. Thin ceramic sheets are extremely fragile. For that reason, as well as interface resistance factors cited above, it is desirable to fabricate the electrode-electrolyte-electrode or LSM-YSZ-LSM sandwich in the unfired state and cofire it as a single unitary composite structure.

Manganese in the LSM electrode layer will migrate into the crystal lattice of the YSZ layer during sintering at normal YSZ sintering temperatures of about 1400° C. The migration of manganese into the electrolyte and the depletion of manganese from the electrode has a detrimental effect on the conductivity of both layers. It is, therefore, desirable to lower the sandwich sintering temperature while still achieving full density in the YSZ layer.

In this invention, full density is achieved in the electrolyte layer by sintering a layer that is completely dispersed, i.e., contains no powder agglomerates and, therefore, only small mono-sized pores. By the term "mono-sized" pores as used herein is meant that the pores are relatively small and all about the same size. Such mono-sized pores will collapse at a relatively lower sintering temperature thereby enabling a high density electrolyte layer to be formed at a sintering temperature below that which will cause removal of all porosity from the LSM layer and/or cause significant migration of manganese from the LSM layer into the YSZ layer. No binders and a small amount of plasticizer is used in this layer so few pores are created by binder-plasticizer removal.

In this invention, relatively high porosity is achieved in the LSM electrode layer by using a highly agglomerated LSM powder with both large and small pores. During sintering of the ceramic sandwich of this invention, the small pores in the electrolyte and electrode sinter out while the large pores in the electrode grow larger thereby forming a dense YSZ electrolyte layer and a highly porous LSM electrode layer. This layer contains large percentage binder-plasticizer which creates porosity when removed by burn out or sintering.

For the YSZ electrolyte layer to be efficient in separating oxygen from air it is necessary that the YSZ layer be gas impermeable. It is also desirable that the YSZ be at least about 95% theoretical density because porosity acts as a second phase with infinite resistance thereby lowering the efficiency of the separation. It is also desirable to make the YSZ layer as thin as possible because the $I^2R$ losses are directly proportional to the layer thickness. Because of the fragile nature of ceramics it was necessary to make large diameter thin sheets of electrolyte on a support structure. In this invention, the two electrode LSM layers were used as substrates to support the YSZ layer.

It was also found that the resistance of the electrolyte-electrode interface could be lowered significantly if a small amount of cerium dioxide or ceria was added to the interface. However, when the entire surface of the interface was covered with ceria, the electrodes delaminated from the electrolyte. A mixture of LSM and ceria at the interface also produced significant reduction in cell resistance. Thus, one embodiment of this invention comprises adding a small amount of ceria to the LSM tape before casting the YSZ slurry or slip thereon. Another embodiment of this invention comprises a 5 layer ceramic with LSM-ceria layers sandwiching the YSZ layer and LSM layers sandwiching the LSM-ceria to YSZ to LSM-ceria layers. It is believed that ceria conducts both oxygen ions and electrons, at the interface.

In one embodiment of this invention the ceria is added directly to the interface. In another embodiment, a layer of ceria mixed with LSM is cast on the LSM layer. For example, a slurry of ceria and LSM is prepared having a ceria content of from about 2 to about 50 weight % based on total ceria and LSM content, and in a preferred embodiment the ceria content is from abut 8 to about 10 weight %. In the embodiment of the invention wherein ceria is added directly to the interface about 1 to about 30% of the interface area is covered with ceria, and in a preferred embodiment about 5 to about 15% of the interface area is covered with ceria.

The solids loading of the unfired YSZ layer should be as high as possible so that the amount of porosity to be removed during sintering will be as low as possible. It is most important that the pores in the unfired YSZ layer be monosized. The smallest pores in the YSZ layer are removed during sintering first at a lower temperature, and the resultant shrinkage of the volume around the small pores causes any larger pores that exist to grow even larger. The time and temperature required to remove the large pores thus becomes even greater thereby increasing the opportunity for manganese to diffuse into the YSZ layer. This invention prevented the inclusion of large pores in the YSZ layer by using a submicron size YSZ in the slurry. However, submicron, high surface area ceramic powders are easily agglomerated thereby increasing the chances for inclusion of large pores in the YSZ slurry. This invention prevents the inclusion of large pores by forming a highly dispersed YSZ slurry thereby preventing the formation of YSZ agglomerates.

Thus there are two types of pores in the YSZ layer to be concerned about, namely the small intra-agglomerate pores and the large inter-agglomerate pores. During sintering the intra-agglomerated pores are easily removed at a lower temperature, at which time the inter-agglomerate pores grow even larger. A long high temperature sintering is then required to remove the pores in the YSZ layer which in turn promotes the migration of manganese from the adjacent LSM layers to the YSZ layer and causes a decrease in the porosity of the LSM layer.

In this invention it was discovered that it was possible to sinter the YSZ to more than 98% of theoretical density at 1300° C. by completely dispersing the submicron sized starting powder. A series of experiments was conducted that determined the most effective dispersing agent for the submicron YSZ powder to be menhaden fish oil.

When sandwich discs were made from a highly dispersed submicron YSZ powder slurry containing no binders or plasticizers it was found that the dried YSZ layer had a network of very fine drying cracks. As a further improvement this invention added a very slow drying oil to the submicron YSZ powder slurry to decrease the drying rate. The slow drying oils prevented cracking during drying. In particular, cracking was prevented by adding 10% slow drying oil, such as linseed oil, to the slurry. Linseed oil is similar to menhaden fish oil but also contains from one to three double bonds where cross-linking can occur. It is believed that the slight amount of cross-linking imparts to the YSZ layer just enough plasticity to allow solvent removal without cracking. Other drying oils or anti-cracking agents rather than linseed oil can be used if they are slow drying because of cross-linking.

Since it had been found that 1300° C. was required to fully densify the dispersed YSZ electrolyte layer and that no significant manganese migration would occur at that temperature, it then became necessary to fabricate LSM layers that would bond well to the YSZ layer and contain the proper amount and size of pores. It was determined that an effective porosity would be 40–50 volume percent for the LSM layer and that the pores should be about one to about five microns in size.

Commercially available LSM ceramic powder is submicron size with a surface area of 3 to 5 $m^2/g$. It was found that commercially available powder would sinter to a too dense layer at 1300° C., even if the unfired layer contained a large amount of binder-plasticizer.

In this invention it was found that commercially available powder could be formed into large, hard agglomerates by sintering at 1250° C., then crushing and screening and the screened fragmented agglomerates used to form a LSM slurry which could be tape-cast. It was found that the small intra-agglomerate pores in the LSM tape would sinter out at 1300° C., but that the larger inter-agglomerate pores would remain thereby providing the porosity required in the LSM layers to enable an adequate rate of diffusion of air to the three phase boundary for efficient oxygen separation. It was also found that the large hard LSM agglomerates would bond well to each other and to the YSZ electrolyte layer.

When the fired or sintered multilayer ceramic was in the form of a three inch diameter disk it was possible to prevent the edges of the sintered disk from wrinkling during sintering when the thickness of each of the electrode layers was at least about 1.5 times greater than the thickness of the YSZ electrolyte layer. Furthermore, it is preferable that the disks be constrained while sintering and the heating rate be no greater than about 2° C. per minute.

Therefore in this invention the sintering temperature of the central YSZ layer was reduced by controlling particle size and pore size distribution, while at the same time the sintering temperature of the outer LSM layers was increased by controlling the particle and pore size distribution so that a three-layer sandwich can be sintered at a lower temperature. This is achieved in this invention by completely dispersing submicron YSZ particles in a tape with a relatively minimum content of binders and plasticizers, and thereafter casting this tape onto a layer of coarsened LSM powder, highly agglomerated, and which contains a relatively large amount of binders and plasticizers, thereby forming a ceramic sandwich which can be fired at a substantially reduced temperature which is below the temperature required to effect significant migration of manganese from the LSM layer into the YSZ layer.

In general, when casting a layer on top of a preexisting layer which has been cured, the liquid components of the slurry used to form the new layer should not deleteriously react with the preexisting layer. For example, the solvent chosen for the slurry to be used for the new layer should not dissolve or deleteriously react with the cured binder or any residual solvent in the preexisting layer.

Accordingly, there is provided by the principles of this invention a process for forming a composite tape comprising a layer of agglomerated first composition ceramic particles normally fired at a low temperature abutting a layer of dispersed small or submicron size second composition ceramic particles normally fired at a high temperature, said low temperature being substantially lower than said high temperature, said composite tape being operable when fired at a temperature substantially lower than said high temperature but substantially higher than said low temperature for forming an unitary ceramic structure having a first layer of sintered said first composition ceramic particles having no more than about 70% of theoretical density and, bonded to such first layer, a second layer of sintered said second composition ceramic particles having at least about 95% of theoretical density, said process comprising:

(a) presintering first composition ceramic particles normally fired at a low temperature at a predetermined elevated temperature lower than said low temperature for a predetermined period of time operable for agglomerating said first composition ceramic particles thereby forming an agglomerated powder;

(b) lightly crushing said agglomerated powder thereby forming a crushed agglomerate;

(c) mixing said crushed agglomerate with a binder-plasticizer operable when cured for bonding particles of said crushed agglomerate together and a solvent for said binder thereby forming a first slurry, said mixing being operable for degasing said slurry without substantial breakage of said sized agglomerate;

(d) forming a first tape from said first slurry on a molding surface;

(e) while said first tape is on said molding surface, removing solvent from therefrom by evaporation and allowing said binder therein to cure and bond said sized agglomerate therein together thereby forming a bonded first tape;

(f) forming a mixture of small particle size second composition ceramic particles normally fired at a high temperature, a dispersing agent, a second solvent for said dispersing agent, and an anti-cracking agent, said dispersing agent being operable for dispersing said second composition ceramic particles in said mixture;

(g) dispersing said second composition ceramic particles in said mixture thereby forming a dispersed particle second slurry;

(h) forming a second tape from said second slurry on said bonded first tape; and (i) while said second tape is on said bonded first tape, removing an effective amount of said second solvent from said second tape by evaporation so that said second tape will not run thereby forming a composite tape having an outer surface comprising dispersed second composition ceramic particles, said composite tape being operable when fired at a temperature substantially lower than said high temperature but substantially higher than said low temperature for forming an unitary ceramic structure having a first layer of sintered first composition ceramic particles normally fired at a low temperature having no more than about 70% of theoretical density and, bonded to such first layer, a second layer of sintered second composition ceramic particles normally fired at a high temperature having at least about 95% of theoretical density. In another embodiment of this invention the process further comprises firing said composite tape at a temperature substantially lower than said high temperature but substantially higher than said low temperature for a predetermined period of time thereby forming an unitary ceramic structure having a first layer of sintered first composition ceramic particles normally fired at a low temperature having no more than about 70% of theoretical density and, bonded to said first layer, a second layer of sintered second composition ceramic particles normally fired at a high temperature having at least about 95% of theoretical density.

There is also provided by the principles of this invention a process for forming a composite tape comprising a layer of dispersed yttria stabilized zirconia particles of small or submicron size on a layer of agglomerated strontium lanthanum manganite which is operable when fired at a temperature of about 1300° C. for forming a ceramic structure having a first layer of sintered strontium lanthanum manganite having no more than about 70% of theoretical density and, bonded to such first layer, a second layer of sintered yttria stabilized zirconia having at least about 95% of theoretical density without significant migration of manganese from such first layer into such second layer, said process comprising:

(a) presintering strontium lanthanum manganite powder at a predetermined elevated temperature lower than 1300° C. for a predetermined period of time operable for agglomerating said powder thereby forming an agglomerated powder;

(b) lightly crushing said agglomerated powder thereby forming a crushed agglomerate;

(c) mixing said crushed agglomerate with a binder-plasticizer operable when cured for bonding particles of said crushed agglomerate together and a solvent for said binder thereby forming a first slurry, said mixing being operable for degasing said slurry without substantial breakage of said sized agglomerate;

(d) forming a first tape from said first slurry on a molding surface;

(e) while said first tape is on said molding surface, removing solvent from therefrom by evaporation and allowing said binder therein to cure and bond said sized agglomerate therein together thereby forming a bonded first tape;

(f) forming a mixture of small particle size yttria stabilized zirconia powder, a dispersing agent, a second solvent for said dispersing agent, and an anti-cracking agent, said dispersing agent being operable for dispersing said zirconia powder in said mixture;

(g) dispersing said yttria stabilized zirconia powder in said mixture thereby forming a dispersed particle second slurry;

(h) forming a second tape from said second slurry on said bonded first tape; and (i) while said second tape is on said bonded first tape, removing an effective amount of said second solvent from said second tape by evaporation so that said second tape will not run thereby forming a composite tape having an outer surface comprising dispersed yttria stabilized zirconia particles, said composite tape being operable when fired at a temperature of about 1300° C. for forming an unitary ceramic structure having a first layer of sintered strontium lanthanum manganite having no more than about 70% of theoretical density and, bonded to such first layer, a second layer of sintered yttria stabilized zirconia having at least about 95% of theoretical density without significant migration of manganese from such first layer into such second layer. In another embodiment of this invention the process further comprises firing said composite tape at a temperature of about 1300° C. for a predetermined period of time thereby forming an unitary ceramic structure having a first layer of sintered strontium lanthanum manganite having no more than about 70% of theoretical density and, bonded to said first layer, a second layer of sintered yttria stabilized zirconia having at least about 95% of theoretical density with no significant migration of manganese from said first layer into said second layer.

DESCRIPTION OF THE PREFERRED EMBODIMENT

Commercially available LSM powder, having submicron size with a surface area of about 3 to 5 m$^2$/g and a mole ratio of $La_{0.8}Sr_{0.2}MnO_3$, is coarsened by presintering at an elevated temperature for a predetermined period of time. For example, LSM powder is presintered at about 1250° C. for about 2 hours thereby transforming the as received LSM powder into large, hard agglomerates. The sintered powder is then lightly crushed just enough for the crushed material to pass through a predetermined screen which is substantially larger than one micron. For example, the lightly crushed LSM is screened through a screen having an opening of about 53 microns.

The screened LSM is then mixed with a binder and solvent for the binder and stirred just enough to mix the LSM, binder and solvent together but not so vigorously as to break the crushed LSM agglomerates apart. Preferably, a commercial binder-plasticizer system of the butyl acrylic-polyethylene glycol type is used. In an especially preferred embodiment a commercial butyl acrylic-polyethylene glycol binder-plasticizer is used which also contains ethyl alcohol, methylene chloride and naphthalene. Additional methylene chloride can be added if desired. However it should be understood that other binder-plasticizer systems can be used including non-organic aqueous based systems.

The amount of binder-plasticizer used should be small enough that there is not an unacceptable degree of shrinkage after drying but large enough that an adequate level of porosity exists after drying. In particular, a level of interconnected porosity after final sintering of the multilayer ceramic of approximately 40% to 50% in the LSM layers is desirable so that gases will be readily transported through the LSM electrode layer to the YSZ layer. Preferably the interconnected pores will be 1 to 5 microns in size. Thus, while there is a wide range in the amount of binder-plasticizer that may be used, enough must be used to provide adequate coating of the coarsened LSM agglomerate but not so much as to produce an unacceptable degree of shrinkage during subsequent drying. The type of binder-plasticizer system used is not critical and any system which after subsequent drying will hold the agglomerate together can be used including, for example, non-organic aqueous based systems. In general it is believed that any state-of-art binder-plasticizer system can be used.

The LSM slurry or slip is then filtered through a screen to remove over-sized agglomerates and then degassed. Preferably a screen size having an opening of about 100 microns is used to remove such over-sized agglomerates. The screened slurry is degassed to remove air from the slurry. If necessary the degassed slurry is then adjusted to a viscosity of about 2000 cp by addition of solvent. For example, in the butyl acrylic-polyethylene glycol system, additional methylene chloride is added if required to lower the viscosity to about 2000 cp.

The adjusted viscosity slurry is then cast onto the glass of a tape-casting machine to a predetermined thickness desired to form an LSM tape. The LSM tape is then air dried to reduce the amount of solvent thereby permitting the binders to bind the LSM agglomerates together in the form of a tape. For example, for a 200 micron thick green LSM tape, a drying time of about 8 minutes has been used to produce a tape which can be removed from the glass of the tape casting machine without stretching the tape. Other green thicknesses of LSM tape can be cast if desired. For the manufacture of membranes for gas separation it is desirable to minimize the thickness of the green tape. Green thicknesses of about 70 to 130 microns can be made and will form a more efficient membrane. After drying, the tape will contain about 50 to 65% by volume of the agglomerated LSM and 35 to 50% by volume of the binder-plasticizer.

It has been found that distribution of the binder-plasticizer in the dried LSM tape is more concentrated on the side of the tape next to the glass of the tape casting machine and that that side of the LSM tape is flatter than the upper side. In a preferred embodiment the dried green LSM tape is peeled off of the glass and turned over so that the flatter side faces up. The YSZ layer is then case directly on the LSM layer as will be more fully explained.

It is not necessary, however, to turn the green LSM tape over and in an alternative embodiment the green LSM tape is not turned over and the YSZ layer is cast directly on the less flat air dried side of the green LSM tape. In this alternative embodiment the rough air dried side may improve the three phase boundary region in the final sintered membrane between the YSZ and LSM layers by increasing the surface area of such three phase region.

In an especially preferred embodiment a small amount of ceria was added to the air dried green face of the LSM tape which was to receive the YSZ layer to reduce the total cell resistance of the final sintered membrane product. However, caution should be observed not to coat the entire surface of the interface since it has been found that this can cause the YSZ layer to delaminate from the LSM layers in the final membrane. Experiments however with a mixture of LSM and ceria at the interface showed significant reduction in cell electrical resistance. Whether or not ceria is added to the interface, the YSZ layer is then cast directly onto the LSM layer as will be explained.

A second slip or YSZ slip was prepared by mixing commercially available yttria stabilized zirconia powder or YSZ powder, with a dispersant, a solvent for the dispersant and an anticracking agent. The YSZ powder was 8 mole percent yttria stabilized zirconia. Example of such materials are menhaden fish oil as a dispersant, petroleum or mineral spirits as a solvent for the menhaden fish oil, and linseed oil as an anticracking agent or drying oil.

The YSZ powder in such a mixture is dispersed in one embodiment by milling. For example, such a mixture can be milled in a ball mill or jar mill to produce a fully dispersed submicron size YSZ slurry useful for casting in a casting machine. In a preferred embodiment, a commercially available spray dried YSZ powder is used to produce the YSZ slurry. The spray dried YSZ powder is about an 80 micron size powder which comprises agglomerated YSZ particles or crystallites having a particle size of from about 500 to about 1000 angstrom units. The spray dried YSZ powder can be easily handled and that is why it is preferred whereas other YSZ powders which have not been spray dried are difficult to handle, however, such other powders can be used if needed. During grinding or milling the spray dried powder is broken apart and the YSZ crystallites are fully dispersed in the slurry as will be further explained. In particular, it was found that ball milling of the mixture for a 24 hour period of time produced a fully dispersed submicron YSZ slurry operable for casting into a tape.

Other dispersing agents, solvents and anticracking agents can be used. However, experiments have shown that the menhaden fish oil, petroleum spirits and linseed oil produce an YSZ tape which has the YSZ well dispersed and free of cracks. The menhaden fish oil is a triglyceride of fatty acids with an average of 18 carbon-carbon bonds per chain. The chains are fully saturated and thereby contain no double bonds available for crosslinking. YSZ tapes made without the linseed oil were found to contain cracks. YSZ tapes made without binders or plasticizers had a network of very fine cracks. Vibrating during drying of the YSZ tape failed to eliminate such cracks. Higher vapor pressure solvent to increase the drying rate caused more severe cracking. However, slow drying oils were found to reduce cracking and even prevent it from occurring in the dried YSZ tape. It was found that by adding 10% by weight of a slow drying oil, such as, for example, linseed oil to the YSZ slurry, the cracking of the dried YSZ tape was eliminated. Linseed oil contains six triglycerides of fatty acids with carbon-carbon bonds varying between 12 and 18. Some of the chains contain from one to three double bonds and hence crosslinking can occur. While not wishing to be bound by theory, it is believed that the slight amount of crosslinking imparts to the YSZ layer just enough plasticity to allow solvent removal without cracking of the YSZ tape.

In one embodiment after producing the fully dispersed submicron YSZ slurry, if necessary, the viscosity of the slurry was adjusted to about 2000 cp by the addition of petroleum spirits. The adjusted viscosity slurry was then degassed and stored in an airtight container until need for casting the YSZ tape.

The thusly prepared fully dispersed submicron YSZ slip was then cast directly on the air dried LSM tape using a tape casting machine. More specifically the completely dispersed submicron YSZ slurry having a relatively minimum content of binders and plasticizers is cast onto a layer of coarsened, highly agglomerated, bonded LSM which contains a relatively large amount of binders and plasticizers. The resultant green multilayer tape can be fired at a reduced temperature, e.g. about 1300° C., thereby preventing significant manganese migration as will be explained.

The YSZ tape cast upon the dried LSM tape is allowed to air dry for a period of time operable to permit the YSZ tape with the LSM tape as a substrate to be handled, i.e. removed from the casting glass surface of the casting machine, without the YSZ tape running. For a green YSZ tape of about 100 microns the period of time to dry to this extent is about 60 minutes.

In one embodiment, after drying the composite tape of YSZ bonded to LSM is pretrimmed to a size slightly larger than the final product size. For example, in one embodiment having a final product size of about 3 inch diameter circular disk, the composite tape is pretrimmed to about 3.375 inch diameter.

In one embodiment, two pretrimmed 3.375 inch diameter composite disks are cut from the composite tape of YSZ and LSM and one such disk is laid on top of the other so that the YSZ layers abut each other thereby forming a disk with a central YSZ layer and outer LSM layers.

In an alternate embodiment, after drying the YSZ tape, the exposed upper surface of the YSZ tape is folded over on itself to produce a multilayer green tape having a central bonded submicron YSZ layer and outer agglomerated LSM layers. A pretrimmed disk of 3.375 inch diameter is then cut from the folded tape thereby forming a disk with a central YSZ layer and outer LSM layers.

The pretrimmed LSM-YSZ-LSM disk is compressed under an elevated pressure, e.g. about 2000 psia to improve the YSZ-YSZ interface contact and to remove air entrapped at such an interface. The compressed folded tape is then further air dried at an elevated temperature on a flat glass sheet to maintain flatness to remove additional solvent. For example, the disks were heated to about 100° C. for a 20 to 30 minute period of time to remove additional solvent or petroleum spirits from the YSZ layer thereby forming a perfectly relaxed disk.

The relaxed disk is then fired in a predetermined time-temperature sequence, as will be described, to produce a sintered multilayer ceramic structure.

In one embodiment the relaxed 3.375 inch diameter disk is trimmed to its final diameter, e.g. 3 inch diameter, in a punch type cutting machine at a temperature of about 100° C. The punch type cutting machine is heated to prevent introduction of an adverse memory into the disk, i.e. to insure that the disk will remain perfectly flat. For the same reason both the upper and lower surfaces of the pretrimmed and final cut disk are supported during the final cutting or shearing operation so that the final 3 inch diameter disk experiences only a shearing force and not also a bending force at the sheared surface. By supporting both upper and lower surfaces of the disk and by conducting the cutting operation at 100° C. no adverse memory is introduced into the disk from the cutting operation.

Usually in a batch operation the cut disk is cooled down to room temperature by placing it on a preheated flat glass plate, e.g. at a temperature of 100° C., and allowing the disk and glass plate to cool to room temperature slowly. Slow cooling on a flat plate prevents any adverse memory from being introduced into the disk. After cooling the disk is slightly pliable and has a stiffness somewhat like a piece of stiff leather that it can be bent only a small amount before breaking.

By preventing any adverse memory from being introduced into the disk, the tendency for the disk to warp is prevented.

The final sintering operation is conducted on sagger plates over a predetermined sequence of temperatures, and heating rates, sintering times and cooling rates as will be described.

It has been found that the following five step sintering operation produces a strong ceramic structure free of adverse memory. First, the disk is rapidly heated from room temperature to about 100° C. on a sagger plate. Next the disk is slowly heated to about 400° C. at a rate of about 24° C. per hour. The disk is heated to about 1300° C. at a rate of 120° C. per hour and then held at about 1300° C. for about 6 hours. After 6 hours at 1300° C. the disk is completely sintered. The disk is then cooled to room temperature at a rate of 120° C. per hour. Slower rates could be used if desired, however, for economic reasons it is desirable to complete the sintering operation as quickly as possible without introducing any adverse memory into the disk.

The final sintered ceramic structure produced by this method has no adverse memory and has no significant manganese migration and can produce LSM outer layers having from about 50 to about 60% of theoretical density with interconnected pores and a bonded thereto central YSZ layer having at least about 95% theoretical density. Actual measured theoretical density of the YSZ layer has in fact been more than 98% of theoretical density when fired at 1300° C.

In an alternative embodiment which is preferred for a commercial operation, the second LSM layer would not be cast separately from the composite LSM-YSZ tape and then laminated thereto or folded thereon but cast directly on the dried, bonded composite LSM-YSZ tape. In a further embodiment a small amount of ceria is added to the air dried surface of the YSZ tape before the second LSM layer is cast on the composite LSM-YSZ tape.

Scanning electron microscope micrographs of tape-cast multilayer ceramic tapes produced by the principals of this invention have shown that it is possible to produce triple layer tapes of LSM/YSZ/LSM having outer layers of LSM having from about 50 to about 60% of theoretical density with interconnected pores and a porosity of from about 40 to about 50%, with a central YSZ layer having approximately 98% theoretical density. The multilayer ceramic tapes have been fired as a single unitary composite structure at a temperature of about 1300° C. and analysis by scanning electron microscope/edax has shown that there is no detectable diffusion of manganese atoms from the LSM layers into the YSZ layer.

The 3 inch diameter multilayer tapes produced by this invention shrunk to about 2.5 inch diameter after sintering at 1300° C. and the LSM layer thickness was about 0.007 inches, the YSZ layer thickness about 0.003 inches after sintering, and the overall thickness about 0.017 inches.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention and that variations in such minor details will be apparent to one skilled in the art.

Therefore it is to be understood that the present disclosure and embodiment of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

What is claimed is:

1. A layered composition-of-matter comprising:
   a sintered central layer of stabilized zirconia having a density of at least about 95% of theoretical; and
   sintered outer layers of doped lanthanum manganite having a density from about 50 to about 60% of theoretical, and having interconnected porosity from about 40 to 50% with an interconnected pore diameter from about one micron to about five microns, said sintered central layer being sandwiched by and bonded and sintered to said outer layers, said sintered central layer being essentially free of significant amounts of manganese.

2. The composition-of-matter of claim 1, wherein said layers define interfaces, and further comprising a relatively small amount of a substance in said interfaces, said substance being operable for increasing the electrical conductivity of said interfaces.

3. A ceramic structure operable as a membrane for separating oxygen from air comprising:
   a sintered central layer of yttria stabilized zirconia which is about 8 mole percent yttria and having a density of at least about 95% of theoretical; and
   sintered outer layers of strontium lanthanum manganite having the approximate molecular composition $La_{0.8}Sr_{0.2}MnO_3$, having a density from about 50 to about 60% of theoretical, and having interconnected porosity from about 40 to about 50% with an interconnected pore diameter from about one micron to about five microns, said sintered central layer being sandwiched by and bonded and sintered to said outer layers, said sintered central layer being essentially free of significant amounts of manganese.

4. The ceramic structure of claim 3, wherein said layers define interfaces, and further comprising a relatively small amount of ceria in said interface.

5. The layered composition-of-matter of claim 2, wherein said substance is ceria.

6. The ceramic structure of claim 4, wherein said layers define interfaces, and further comprising a relatively small amount of a substance in said interfaces, said substance being operable for increasing the electrical conductivity of said interfaces.

7. A layered composition-of-matter comprising:
   a sintered central layer of stabilized zirconia having a density of at least about 95% of theoretical; and
   sintered outer layers of doped lanthanum manganite having a density from about 50 to about 60% of theoretical, and having interconnected porosity from about 40 to about 50%, said sintered central layer being sandwiched by and bonded and sintered to said outer layers.

8. The layered composition-of-matter of claim 7, wherein said interconnected porosity has a pore diameter from about one micron to about five microns.

9. The layered composition-of-matter of claim 7, wherein said sintered central layer is essentially free of significant amounts of manganese.

10. The layered composition-of-matter of claim 7, wherein said layers define interfaces, and further comprising a relatively small amount of a substance in said interfaces, said substance being operable for increasing the electrical conductivity of said interfaces.

11. The layered composition-of-matter of claim 10, wherein said substance is ceria.

12. A ceramic structure operable as a membrane for separating oxygen from air comprising:
   a sintered central layer of yttria stabilized zirconia having a density of at least about 95% of theoretical; and
   sintered outer layers of strontium lanthanum manganite having a density from about 50 to about 60% of theoretical, and having interconnected porosity from about 40 to about 50%, said sintered central layer being sandwiched by and bonded and sintered to said outer layers.

13. The ceramic structure of claim 12, wherein said sintered central layer of yttria stabilized zirconia is about 8 mole percent yttria.

14. The ceramic structure of claim 12, wherein said sintered outer layers of strontium lanthanum manganite have an approximate molecular composition of $La_{0.8}Sr_{0.2}MnO_3$.

15. The ceramic structure of claim 12, wherein said interconnected porosity has a pore diameter from about one micron to about five microns.

16. The ceramic structure of claim 12, wherein said sintered central layer is essentially free of significant amounts of manganese.

17. The ceramic structure of claim 12, wherein said layers define interfaces, and further comprising a relatively small amount of a substance in said interfaces, said substance being operable for increasing the electrical conductivity of said interfaces.

18. The ceramic structure of claim 17, wherein said substance is ceria.

19. An unitary ceramic structure comprising:
a first layer of sintered preagglomerated ceramic particles of a first composition which is operable for the flow therethrough of electrical current, said first layer having a density which is no more than about 70% of theoretical density, said first layer having interconnected pores which allow for the flow therethrough of gas; and
a second layer of sintered dispersed small size ceramic particles of a second composition which is operable for the flow therethrough of ions, the second layer being bonded by sintering to the first layer to form an unitary ceramic structure, said second layer having a density which is at least about 95% of theoretical density, said second layer being impervious to the flow therethrough of gas.

20. The unitary ceramic structure of claim 19,
wherein said ceramic particles of the first composition are normally sintered at a lower temperature,
wherein said preagglomerated ceramic particles of the first composition have been presintered at a presintering temperature lower than said lower temperature at which ceramic particles of the first composition are normally sintered,
wherein ceramic particles of the second composition are normally sintered at a higher temperature, and
wherein the second layer has been bonded to the first layer by simultaneously sintering of the layers at a temperature substantially lower than said higher temperature at which ceramic particles of the second composition are normally sintered, but substantially higher than said lower temperature at which ceramic particles of the first composition are normally sintered.

21. The unitary ceramic structure of claim 19, wherein said layers define an interface therebetween, and further comprising a relatively small amount of a substance in said interface operable for increasing the electrical conductivity of said unitary ceramic structure.

22. An unitary ceramic structure comprising:
a first layer of sintered preagglomerated ceramic particles of a first composition which is operable for the flow therethrough of electrical current, the first layer having a density which is no more than about 70% of theoretical density, the first layer having interconnected pores which allow for the flow therethrough of gas;
a second layer of sintered dispersed small size ceramic particles of a second composition which is operable for the flow therethrough of ions, the second layer having a density which is at least about 95% of theoretical density, the second layer being impervious to the flow therethrough of gas; and
a third layer of sintered preagglomerated ceramic particles of a third composition which is operable for the flow therethrough of electrical current, the third layer having a density which is no more than about 70% of theoretical density, the third layer having interconnected pores which allow for the flow therethrough of gas, and wherein the second layer is bonded on one side thereof to the first layer and on the other side thereof to the third layer thereby forming an unitary ceramic structure.

23. The unitary ceramic structure of claim 22, wherein the layers define interfaces therebetween, and further comprising a relatively small amount of a substance in the interfaces operable for increasing the electrical conductivity of the unitary ceramic structure.

24. The unitary ceramic structure of claim 22, wherein the composition of the third layer is the same as the composition of the first layer.

25. The unitary ceramic structure of claim 23, wherein the composition of the third layer is the same as the composition of the first layer.

* * * * *